Oct. 11, 1938.  C. G. A. ROSÉN  2,132,805
PISTON
Original Filed Aug. 8, 1933  3 Sheets-Sheet 3

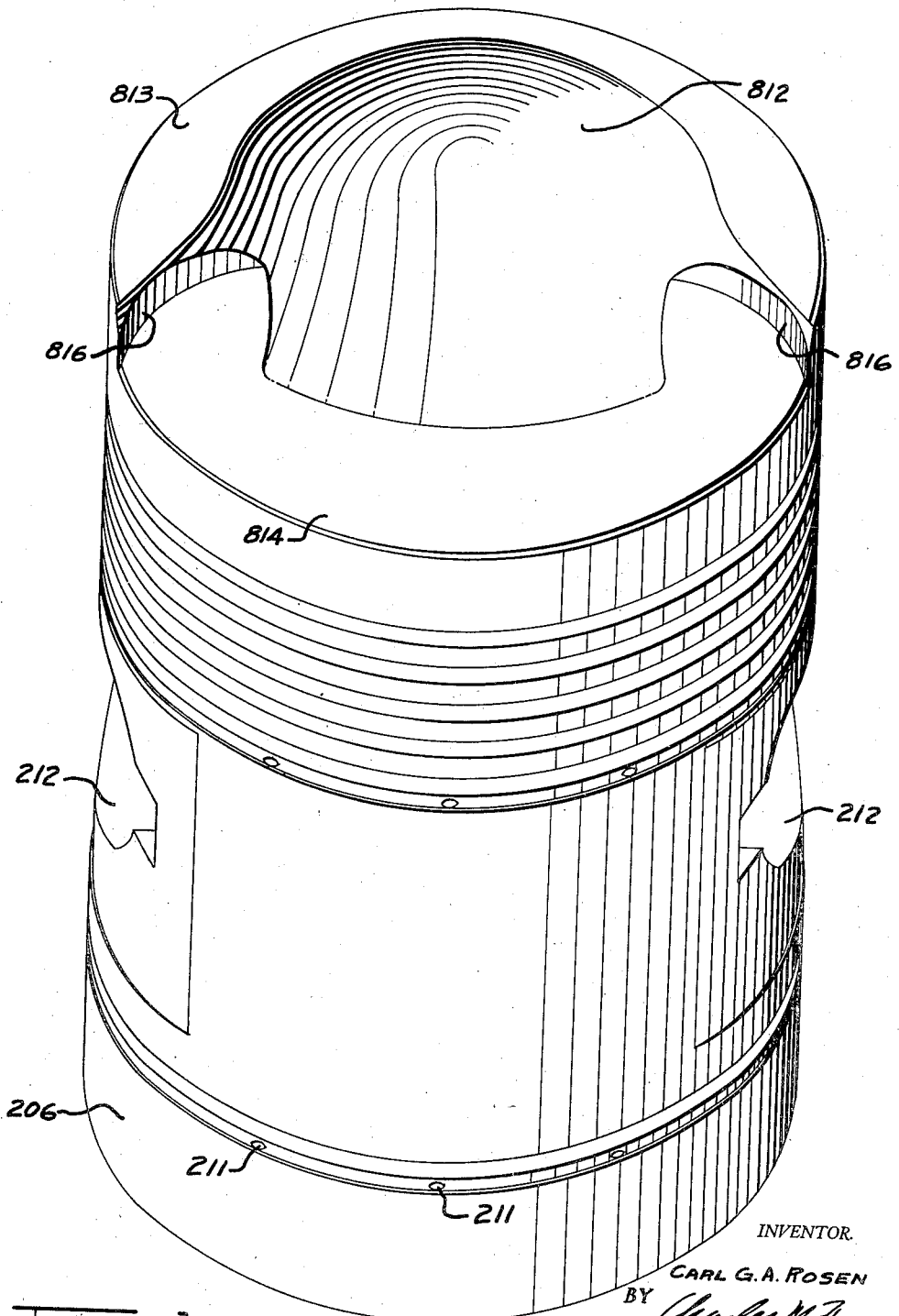

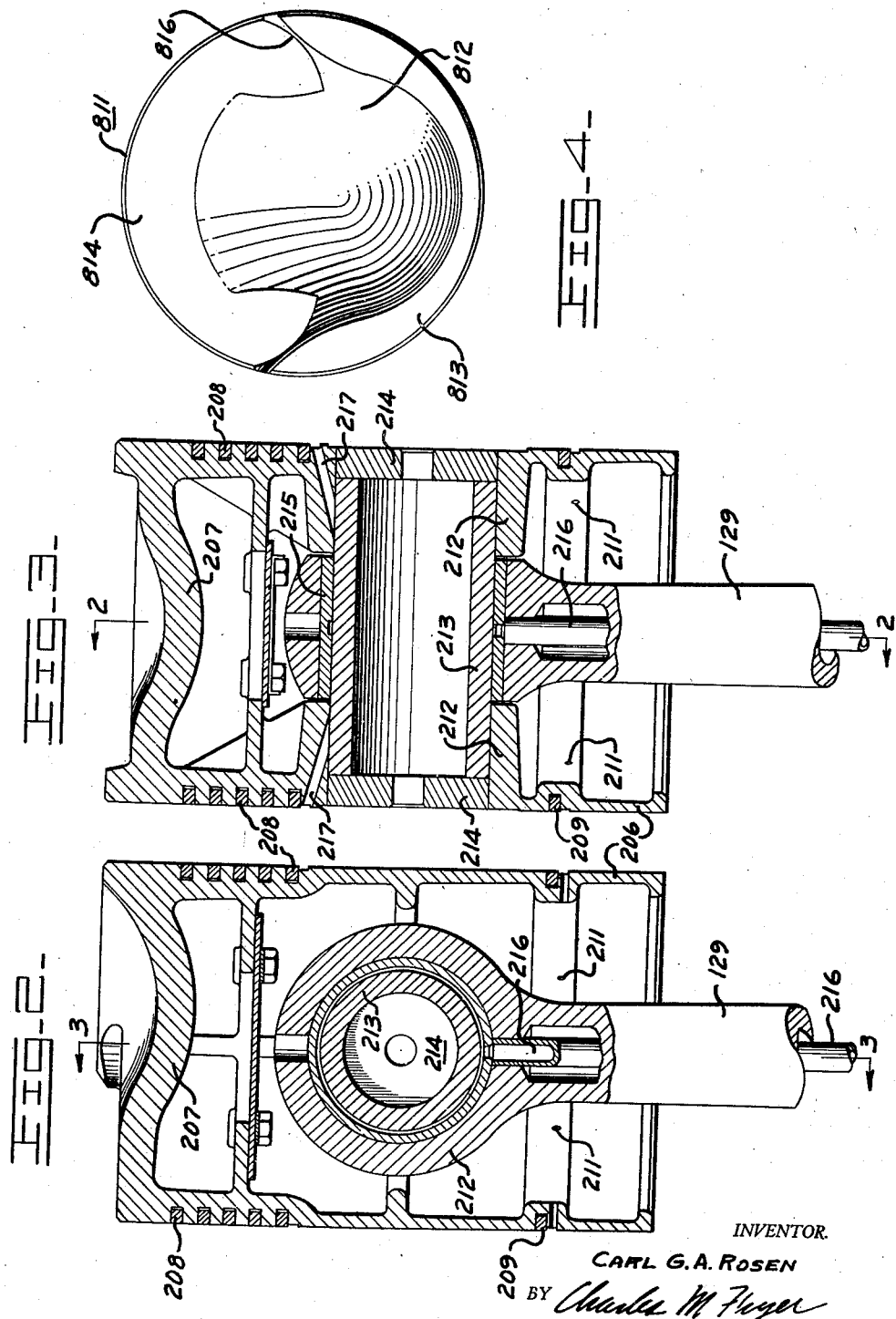

INVENTOR.
CARL G. A. ROSÉN
BY Charles M Frazer
ATTORNEY.

Patented Oct. 11, 1938

2,132,805

UNITED STATES PATENT OFFICE 2,132,805

PISTON

Carl G. A. Rosén, Oakland, Calif., assignor to Caterpillar Tractor Co., San Leandro, Calif., a corporation of California Original application August 8, 1933, Serial No. 684,179. Divided and this application October 11, 1937, Serial No. 168,430. Application October 11, 1937, Serial No. 168,430

6 Claims. (Cl. 123—32)

My invention relates to internal combustion engines and more particularly to an improved piston for use in such engines.

This application is a division of my application Serial No. 684,179, filed August 8, 1933, and assigned to the Caterpillar Tractor Co., assignee of the present application.

To maintain similarity between this divisional application and the parent case from which it originates, the descriptive matter, in so far as practical to obtain continuity and clearance corresponds to the pertinent portions of the parent case, and the reference characters, likewise correspond in both cases.

In internal combustion engines, more particularly those of the compression ignition type, wherein fuel under pressure is injected into a cylinder and ignited by heat of compression, the volume and contour of the combustion chamber formed between the piston and the cylinder head play an important part in determining the combustion characteristics of the mixture formed between the injected fuel and the air in the cylinder. The ideal condition strived for is to obtain smooth but rapid mixing of the fuel and air, with sufficient air present to enable complete combustion of the fuel. With this condition realized, a smooth and even running engine will result and maximum power output from the engine will be obtained.

It is accordingly an object of my invention to provide an improved piston which:

(1) Shall effect mixture of fuel and air in the combustion chamber with increased efficiency; and (2) Shall in an improved manner control the rate of burning of fuel to prevent sudden impacts and detonations within the cylinder.

Additional objects of my invention will be pointed out in the following description of the same taken in connection with the accompanying drawings wherein:

Fig. 1 is a perspective view of my improved piston.

Fig. 2 is a section taken on line 2—2 of Fig. 3.

Fig. 3 is a section taken on line 3—3 of Fig. 2.

Fig. 4 is a plan view of the crown of the piston.

The method of fuel combustion disclosed herein provides for reliable and smooth operation of the engine without detonation or rough running, and permits the use of comparatively simple fuel injection nozzles operated by differential fuel pressure. During the many years in which compression ignition engines have been known, the combustion process in such engines has been considered as being dissimilar to, and presenting different problems than, the combustion process in spark ignition engines. In this time, the only solution which has been offered to the problem of preventing detonation and rough running in compression ignition engines has been the provision of complicated mechanical fuel injection apparatus requiring delicate adjustment for controlling the rate of fuel injection to control the combustion process.

In my invention, I employ the idea of injecting fuel in the form of a finely divided spray into a precombustion chamber which communicated with the main combustion chamber through restricted orifices. The injected fuel was to meet an incoming charge of air in the precombustion chamber, the oxygen therein being insufficient to support complete combustion, and the temperature being such as to cause ignition. Thus, the explosion in the precombustion chamber was to consume only part of the fuel, the remainder being shattered and discharged in a gaseous state and at a high velocity into the main combustion chamber where the main supply of oxygen was to be available, the charge being distributed throughout the main combustion chamber before the flame of the explosion was introduced. In the combustion chamber design, I intended to apply the method of preventing detonation and rough running which was known in spark ignition gasoline engines, but whose applicability in compression ignition engines had never, to my knowledge, been recognized or tried. This method of preventing detonation and rough running consists generally in controlling the expanding pressure wave or flame front, which expands outwardly from the point of flame injection from the precombustion chamber as a center, by constructing the combustion chamber to provide varying ratios of surface to volume therein to control the combustion process, whereby the last burned portion of gas is cooled and the pressure wave retarded as it approaches the cylinder wall.

I constructed an engine designed to operate as described above and found that it operated successfully in accordance with the method I had conceived. The design of the precombustion and main combustion chambers which afford this method of fuel combustion will now be described.

Figure 5:
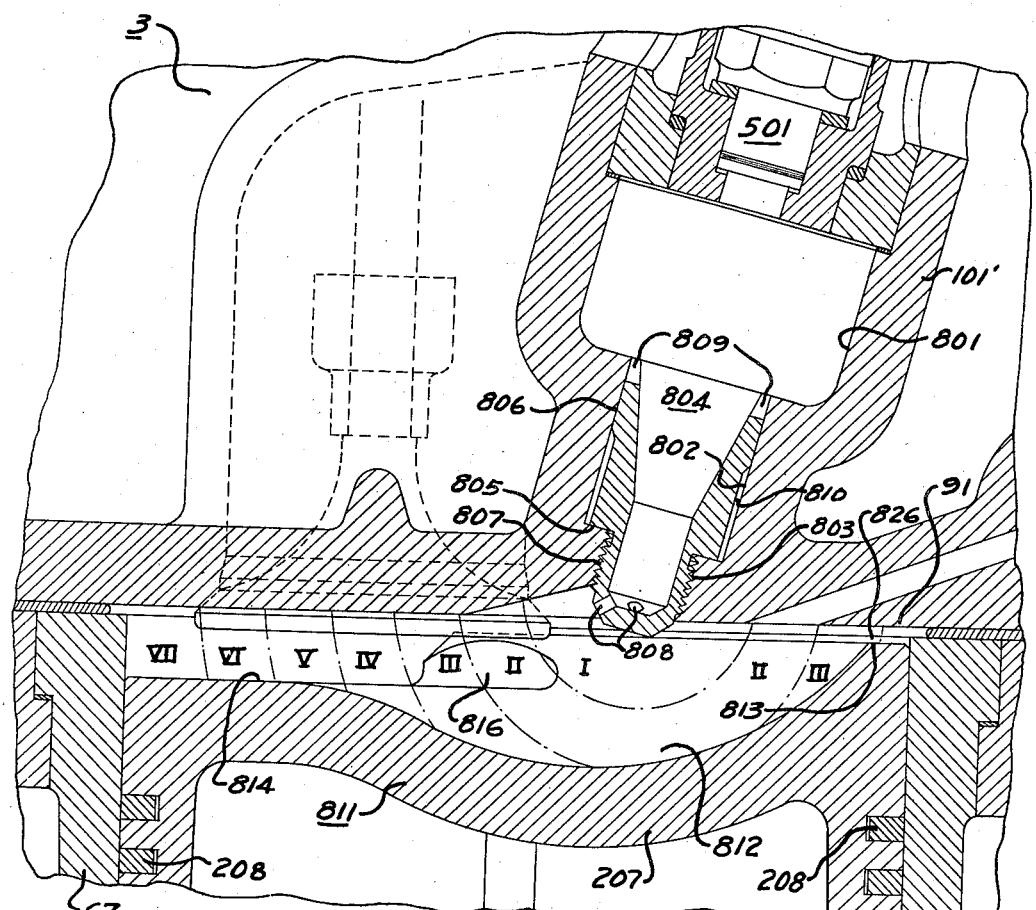
Figs. 5, 6 and 7 are views illustrating the combustion characteristics resulting from the use of my improved piston, and includes in Fig. 5 a view in cross section of those parts which define the precombustion chamber and the main combustion chamber.

The precombustion chamber (Fig. 5) is formed within relatively thick cylindrical wall 101' of cylinder head 3 which has internal walls 801, 802, and 803 of decreasing diameters below nozzle 501. Burner tube 804 is seated against shoulder 805 between walls 803, 802 and at the top engages wall 802 at 806. At its lower end, tube 804 has threaded engagement with wall 803 at 807, and is provided adjacent its end with a plurality of orifices or outlets 808 providing for egress of fuel from the precombustion chamber to the combustion chamber. Slots 809 at the top of tube 804 provide means for threading the tube in wall 101'. The inner walls of the burner tube converge conically from the top to a cylindrical portion closed at its lower end except for outlets 808.

It is to be noted from the above description that the precombustion chamber is formed of sections converging inwardly to provide for increased velocity of the fuel in passing threfrom to the combustion chamber. The relatively thick wall of the precombustion chamber aids in promoting proper thermal conditions therein. It is also to be noted that water in the cylinder head has free access to cylinder wall 101' providing efficient cooling of the precombustion chamber. The operation of the precombustion chamber during fuel combustion is described hereinafter.

My improved piston includes cylindrical wall portion 206 terminating in recessed head 207. The recessed head is especially formed in accordance with desired combustion chamber characteristics and is fully described in a later section.

Adjacent the upper portion of cylindrical portion 206 a plurality of peripheral recesses are provided in which rings 208 are seated. Rings 208 are of conventional construction. Adjacent the lower end of cylindrical portion 206 a single peripheral recess is provided, having oil ring 209 seated in the deeper portion thereof. The shallow portion of the recess is provided with a plurality of apertures 211 communicating with the interior of cylindrical portion 206 to provide oil outlets.

Substantially centrally of cylindrical portion 206, opposite apertured bosses 212 are provided which are adapted to receive hollow wrist pin 213 which is held therein by plugs 214. Pin 213 provides a journal for upper bearing 215 of connecting rod 129. Lubricant is transmitted to upper bearing 215 through conduit 216 mounted in connecting rod 129 and receiving lubricant from the lower connecting rod bearing not shown. Lubricant is transmitted through apertures 217 in bosses 212 from the shallow portion of the recess containing lower ring 208 to the bearing surfaces of wrist pin 213 in said bosses 212. From the foregoing description, it is seen that lubricant is brought by pressure through the connecting rod 129 to the upper connecting rod bearing 215, and from the bearing surfaces of the piston and the cylinder wall to wrist pin bearings 212 in the piston.

The combustion chamber is arranged to provide against detonation and rough running so that smooth operation of the engine is possible without extremely accurate measuring of the fuel rate through the nozzle 501, and is formed between the cylinder head 91 and the crown 207 of the piston to provide a substantially central combustion chamber proper providing a concentrated volume of air into which fuel is injected from the precombustion chamber. Leading from the combustion chamber proper is a restricted space provided for a purpose described later in connection with the method of fuel combustion.

In the preferred form of the invention, the crown of the piston is machined to provide the combustion chamber. Piston crown 811 is provided with a depression 812 slightly offset from the center thereof, and of a shape corresponding substantially to a segment of a sphere. This depression terminates in a peripheral wall, a portion of which constitutes a relatively high peripheral ledge 813 which extends around substantially one-half of the piston crown gradually widening as it approaches its extremities. The terminating walls 816 of the ledge 813 are vertical but arcuate in shape to accommodate intake and exhaust valves. The remaining portion 814 of the peripheral wall of crown 811 is flat and of substantially uniform width until it approaches the vertical walls 816 where it broadens out gradually to a width equal to the length of the walls 816. The depression 812 is made to gradually merge into the flat portion 814 of the peripheral wall to provide for smooth flow of combustible mixture to the remote portions of the combustion chamber.

The method of fuel combustion is designed to provide smooth operation and prevent detonation and rough running, the entire flow of fuel in both liquid and gaseous states being controlled by utilizing the kinetic energy of the fuel under pressure. It is believed that the method can best be described by following the fuel from the time of its injection into the precombustion chamber through its burning in the combustion chamber. The upward movement of the piston compresses air in the main combustion chamber which has access to the precombustion chamber through holes or orifices 808. About 15° before top dead center of the compression stroke, fuel under pressure is introduced into the space defined by wall 801 of the precombustion chamber. The fuel is introduced in the form of a conical spray which strikes the walls of the burner tube 804, the temperature of which is controlled by the area of contact at 806 which transfers heat from the portion of the burner tube wall insulated from wall 802 by space 810. The interior of the conical spray is met by a stream of air forced up through orifices 808. At about 8° before top center, ignition takes place in the precombustion chamber solely due to the vaporized condition of the fuel injected therein and the temperature existing therein. Inasmuch as the total volume of the precombustion chamber, i. e., within wall 801 and burner tube 804, is substantially 28° of the total combustion chamber space, only a limited amount of fuel can be consumed in the precombustion chamber space, such amount being substantially 20% of the fuel introduced for the full load charge.

The remaining fuel introduced is shattered by the explosion of the preliminary portion of introduced fuel, whereby the remaining fuel charge is gasified. The increased pressure existing in the precombustion chamber space, due to the explosion therein, causes a flow of gasified fuel down through the channel defined by the burner tube 804 and out through openings 808 into the main combustion space. The fuel which emerges from openings 808 is of a gaseous nature, moving at a high velocity with considerable turbulence. The charge of fuel is introduced into a swirling current of air whereby thorough fuel distribution and high turbulence is obtained.

Figure 6:
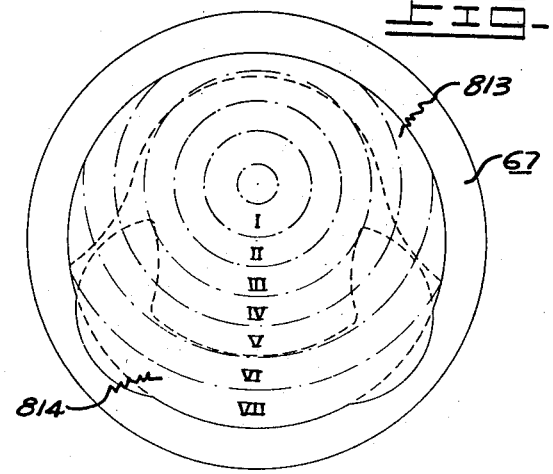

Heretofore, in compression ignition engines, it has been found necessary to provide extremely accurate measuring of the fuel rate through the injection nozzle to determine the correct rate of combustion in the main combustion chamber to prevent severe impacts on the wall of the cylinder by detonation waves, and to prevent rough running of the engine. For convenience in describing the action of the fuel in response to the combustion chamber design disclosed herein, which obviates the necessity for extremely accurate measuring of the fuel rate, the space within the main combustion chamber is divided into seven zones. These zones are defined by spherical portions of increasing size having their center approximately at the discharge end of the burner tube and are numbered from I to VII in Figs. 5 and 6, being indicated in phantom lines.

The unburned gas as it enters zone I starts burning, and as further fuel is introduced, the flame spreads from zone I, to II, to III, etc. Due to the fact that ledge 813 (Fig. 5) is spaced closely to wall 91 of the cylinder head and extends around substantially half the circumference of the piston crown (as indicated in dotted lines in Fig. 6), a substantial portion of zone IV is occupied by said ledge 813, only narrow space 826 (Fig. 5) remaining between ledge 813 and the cylinder head. This space represents substantially 17% of the total piston area and is cooled by virtue of its close contact with the cylinder head. Due to the close spacing and the cooling, no detonation wave can reach the wall of the cylinder adjacent ledge 813.

Figure 7:
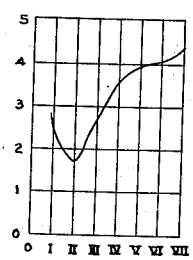

This condition, however, causes increased pressure within zone IV and if this pressure is not reduced, a detonation wave will strike the cylinder wall opposite to ledge 813. The restricted space between flat portion 814 of the piston crown and the cylinder head walls damps out the pressure wave, which is cooled due to the water space adjacent cylinder head wall 91. The construction of piston crown 811 adjacent wall 814 and cylinder liner 67 provides an increase in combustion chamber surface to volume ratio so that there is then the opportunity for cooling the gas so that the pressure wave does not strike the cylinder liner with a severe impact. The ratio of combustion chamber surface to volume is illustrated in the graph comprising Fig. 7. In this graph the zones are plotted as abscissas, while the ratios are plotted as ordinates. From an inspection of this graph it is seen that as initial combustion in the main combustion chamber occurs, i. e., in zones I and II, the ratio of surface to volume decreases and increases rapidly, being substantially the same at the beginning of zone III as at the end of zone I. Thereafter the ratio increases rapidly through zones III and IV, increasing less rapidly through zones V and VI.

It is seen, therefore, that the method of fuel combustion disclosed herein eliminates detonation and rough running so that smooth operation of the engine is possible without extremely accurate measuring of the fuel rate through the injection nozzle 501. This is accomplished by arranging the combustion chamber to automatically provide the desired combustion rate and at the same time damping and cooling the flame front as it advances toward the cylinder wall.

I, therefore, claim as my invention:

1. A piston having a crown including a ledge extending around a substantial portion of the circumference thereof and terminating in end walls, the remaining portion of the circumference of said crown being flat and lower than said ledge, said circumferential portions encompassing a depression having the contour of a portion of a sphere.

2. A piston having a crown formed with a depression offset with respect to the center of said piston, said depression having the contour of a portion of a sphere, a portion of the peripheral wall surrounding said depression rising to a different elevation than another portion of said peripheral wall.

3. A piston having a crown formed with a depression having substantially the contour of a portion of a sphere, said depression being offset with respect to the center of said piston, a portion of the peripheral wall surrounding said depression rising to a different elevation than another portion of said peripheral wall, said depression gradually merging with the wall of lower elevation.

4. A piston having a crown formed with a depression offset with respect to the center of said piston, said depression having the contour of a portion of a sphere, a peripheral wall surrounding said depression, a portion of said peripheral wall being higher than another portion and having its end boundaries shaped to provide clearance for inlet and exhaust valves.

5. A piston having a crown formed with a depression offset with respect to the center of said piston, said depression having the contour of a portion of a sphere, a portion of the peripheral wall surrounding said depression rising to a different elevation than another portion of said peripheral wall, said crown in combination with a cylinder head and cylinder wall providing a combustion chamber in an engine wherein the wave front of an exploding mixture will cool sufficiently before reaching the cylinder wall to preclude detonation.

6. A piston having a crown formed with a depression offset with respect to the center of said piston, said depression having the contour of a portion of a sphere, a peripheral wall surrounding said depression, a portion of which wall rises to a higher elevation than the remaining portion and terminates in vertical end walls which are arcuate in shape to accommodate inlet and exhaust valves when said piston is mounted in an engine, said remaining portion of said peripheral wall being flat and of substantially uniform width until it approaches said vertical end walls where said remaining portion gradually increases in width until it meets said end walls at which point the width of said remaining portion substantially equals the length of said end walls.

CARL G. A. ROSÉN.